United States Patent
Brotherson et al.

(10) Patent No.: US 12,166,907 B2
(45) Date of Patent: Dec. 10, 2024

(54) DYNAMIC CERTIFICATE MANAGEMENT IN CRYPTOGRAPHIC AGILITY FRAMEWORKS

(71) Applicant: VMware, Inc., Palo Alto, CA (US)

(72) Inventors: Marc Wayne Brotherson, Boulder, CO (US); Mark Benson, Wokingham (GB); Daniel James Beveridge, Valrico, FL (US); Sean Huntley, Sydney (AU); Akeem Jenkins, Broomfield, CO (US); David Ott, Chandler, AZ (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/360,019

(22) Filed: Jul. 27, 2023

(65) Prior Publication Data

US 2024/0080207 A1    Mar. 7, 2024

Related U.S. Application Data

(63) Continuation of application No. 17/385,633, filed on Jul. 26, 2021, now Pat. No. 11,818,278.

(51) Int. Cl.
*H04L 9/32*    (2006.01)
*H04L 9/08*    (2006.01)
*H04L 9/00*    (2022.01)

(52) U.S. Cl.
CPC .......... *H04L 9/3268* (2013.01); *H04L 9/0819* (2013.01); *H04L 9/3236* (2013.01); *H04L 9/50* (2022.05)

(58) Field of Classification Search
CPC .................................................. H04L 9/3268
See application file for complete search history.

(56) References Cited

U.S. PATENT DOCUMENTS 9,900,287 B1    2/2018    Jooste et al.
9,946,884 B2    4/2018    Antipa et al.
(Continued)

FOREIGN PATENT DOCUMENTS

EP    3664407 A1    6/2020
WO    2018118051 A1    6/2018
WO    2020106973 A1    5/2020

OTHER PUBLICATIONS

International Search Report/ Written Opinion issued to PCT/US2022/045578 on Feb. 16, 2023.
(Continued)

*Primary Examiner* — Bradley W Holder
(74) *Attorney, Agent, or Firm* — King Intellectual Asset Management

(57) ABSTRACT

The disclosure provides an approach for certificate management for cryptographic agility. Embodiments include receiving, by a cryptographic agility system, a cryptographic request related to an application. Embodiments include selecting, by the cryptographic agility system, a cryptographic technique based on contextual information associated with the cryptographic request. Embodiments include determining, by the cryptographic agility system, based on the cryptographic request, a certificate for authenticating a key related to the cryptographic technique. Embodiments include providing, by the cryptographic agility system, the certificate to an endpoint related to the cryptographic request for use in authenticating the key.

20 Claims, 4 Drawing Sheets

(56) References Cited

U.S. PATENT DOCUMENTS

| | | |
|---|---|---|
| 10,291,589 B1 | 5/2019 | Sharifi Mehr |
| 10,454,689 B1 | 10/2019 | Sharifi Mehr |
| 2010/0281270 A1 | 11/2010 | Miyazaki et al. |
| 2011/0185178 A1* | 7/2011 | Gotthardt .............. H04L 9/3263 713/172 |
| 2012/0072721 A1* | 3/2012 | Rescorla ................ H04L 63/20 713/158 |
| 2012/0131354 A1 | 5/2012 | French |
| 2012/0275598 A1* | 11/2012 | Vimpari ............... H04L 9/0872 380/255 |
| 2014/0245004 A1 | 8/2014 | Houston et al. |
| 2015/0139424 A1 | 5/2015 | Campagna et al. |
| 2017/0006064 A1 | 1/2017 | Agarwal et al. |
| 2017/0093585 A1* | 3/2017 | Lee .......................... H04L 9/14 |
| 2017/0346636 A1 | 11/2017 | Hernacki et al. |
| 2019/0273728 A1 | 9/2019 | Sharifi Mehr |
| 2020/0186507 A1 | 6/2020 | Dhanabalan et al. |
| 2023/0022112 A1 | 1/2023 | Beveridge |
| 2023/0026253 A1 | 1/2023 | Beveridge et al. |

OTHER PUBLICATIONS

International Search Report/ Written Opinion issued to PCT/US2022/045588 on Feb. 17, 2023.

* cited by examiner

DYNAMIC CERTIFICATE MANAGEMENT IN CRYPTOGRAPHIC AGILITY FRAMEWORKS

RELATED APPLICATIONS

The present patent application is a continuation of, and hereby claims priority under 35 U.S.C § 120 to pending U.S. patent application Ser. No. 17/385,633, entitled "DYNAMIC CERTIFICATE MANAGEMENT IN CRYPTOGRAPHIC AGILITY FRAMEWORKS," by the same inventors, filed on 26 Jul. 2021, the contents of which are herein incorporated in their entirety by reference for all purposes.

BACKGROUND

Cryptography generally involves techniques for protecting data from unauthorized access. For example, data transmitted over a network may be encrypted in order to protect the data from being accessed by unauthorized parties. For example, even if the encrypted data is obtained by an unauthorized party, if the unauthorized party cannot decrypt the encrypted data, then the unauthorized party cannot access the underlying data. There are many types of cryptographic algorithms, and these algorithms vary in many aspects such as key size, ciphertext size, memory requirements, computation requirements, amenability to hardware acceleration, failure handling, entropy requirements, and the like. Key size refers to the number of bits in a key used by a cryptographic algorithm. Ciphertext size refers to the number of bits in the output from a cryptographic algorithm, which may be the same as the number of bits of the input or may include padding to produce a larger number of bits than the input. Memory requirements and computation requirements generally refer to the amount of memory and processing resources required to perform an algorithm. Amenability to hardware acceleration generally refers to whether an algorithm requires or can be improved through the use of a hardware accelerator. For example, a compute accelerator is an additional hardware or software processing component that processes data faster than a central processing unit (CPU) of the computer. Failure handling refers to the processes by which an algorithm accounts for failures, such as recovering keys that are lost or deactivated. Entropy requirements generally refer to the amount of randomness required by an algorithm, such as an extent to which randomly generated values are used as part of the algorithm (e.g., which generally improves security of the algorithm).

Some cryptographic algorithms may result in a higher level of security (e.g., having more bits of security, more layers of security, larger amounts of entropy, and/or the like) than others, and there may be trade-offs with respect to resource requirements such that higher-security algorithms may require larger amounts of storage, processing, and/or communication resources (e.g., involving the transmission of larger amounts of information over a network). Furthermore, new cryptographic algorithms and libraries are developed on an ongoing basis to meet changing security needs. Cryptographic libraries are collections of cryptographic algorithms that can be invoked, such as through calls to application programming interface (API) functions provided by the libraries, in order to perform various cryptographic functions (e.g., encryption of data, establishing secure connection channels, and/or the like). In some cases, weaknesses in particular algorithms may be discovered over time such as due to advances in computing technology (e.g., a particular algorithm may be susceptible to being compromised through the use of computing devices with more power than the computing devices that were in use at the time the algorithm was developed). For example, algorithms may become problematic and/or become less useful for a variety of reasons, such as due to algorithmic compromise (e.g., a weakness in the algorithm may be discovered and/or exploited), compute performance increases (e.g., the time required to "guess correctly" may be reduced), and/or the like. In some cases, new and/or updated algorithms may be developed to address these issues (e.g., by adding additional bits of security, additional layers of security, more complex forms of encryption, and/or the like).

The rise of quantum computing has raised the possibility of additional issues related to cryptography. For example, the high levels of computational power provided by quantum computing may enable nefarious actors to more easily access data secured with existing cryptographic algorithms, thereby gaining access to sensitive data that was previously believed to be secure.

The dynamic nature of computing technology and the variety of threats that exist to data security necessitate a continuous adapting of cryptography to meet these new circumstances and threats. Furthermore, laws and/or regulations may require certain types of cryptography to be utilized in certain contexts. Thus, compliance with such laws and/or regulations may further necessitate adopting of new and/or different types of cryptographic algorithms.

Conventional software applications are generally designed to implement and/or utilize particular cryptographic algorithms. These algorithms may be customizable in certain respects, but there is generally no convenient mechanism for changing the cryptographic algorithms utilized by an application without modifying the base code of the application, essentially requiring portions of the application code to be rewritten, which is time consuming and difficult. Such code modifications are expensive and error-prone, particularly when done on a regular basis to address the ever-changing landscape of computing security.

Furthermore, if cryptographic algorithms and/or configurations utilized by an application are changed, certificates used for authentication of communications related to the application must also be changed accordingly. In cryptography, a certificate (e.g., public key certificate, digital certificate, or identity certificate) is an electronic document used to prove ownership of a key. A certificate may include, for example, information about a key, information about the identity of a key's owner (sometimes referred to as the subject of the certificate), and a digital signature of an entity that has verified the certificate's validity (sometimes referred to as the issuer of the certificate). If an application analyzing the certificate determines that the signature is valid, and trusts the issuer, then it may determine that is can use the key to communicate securely with the subject of the certificate. Different cryptographic algorithms, involving different keys and types of keys, require different certificates.

As such, there is a need for improved cryptography techniques that allow for cryptographic agility and corresponding agility in certificate management.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
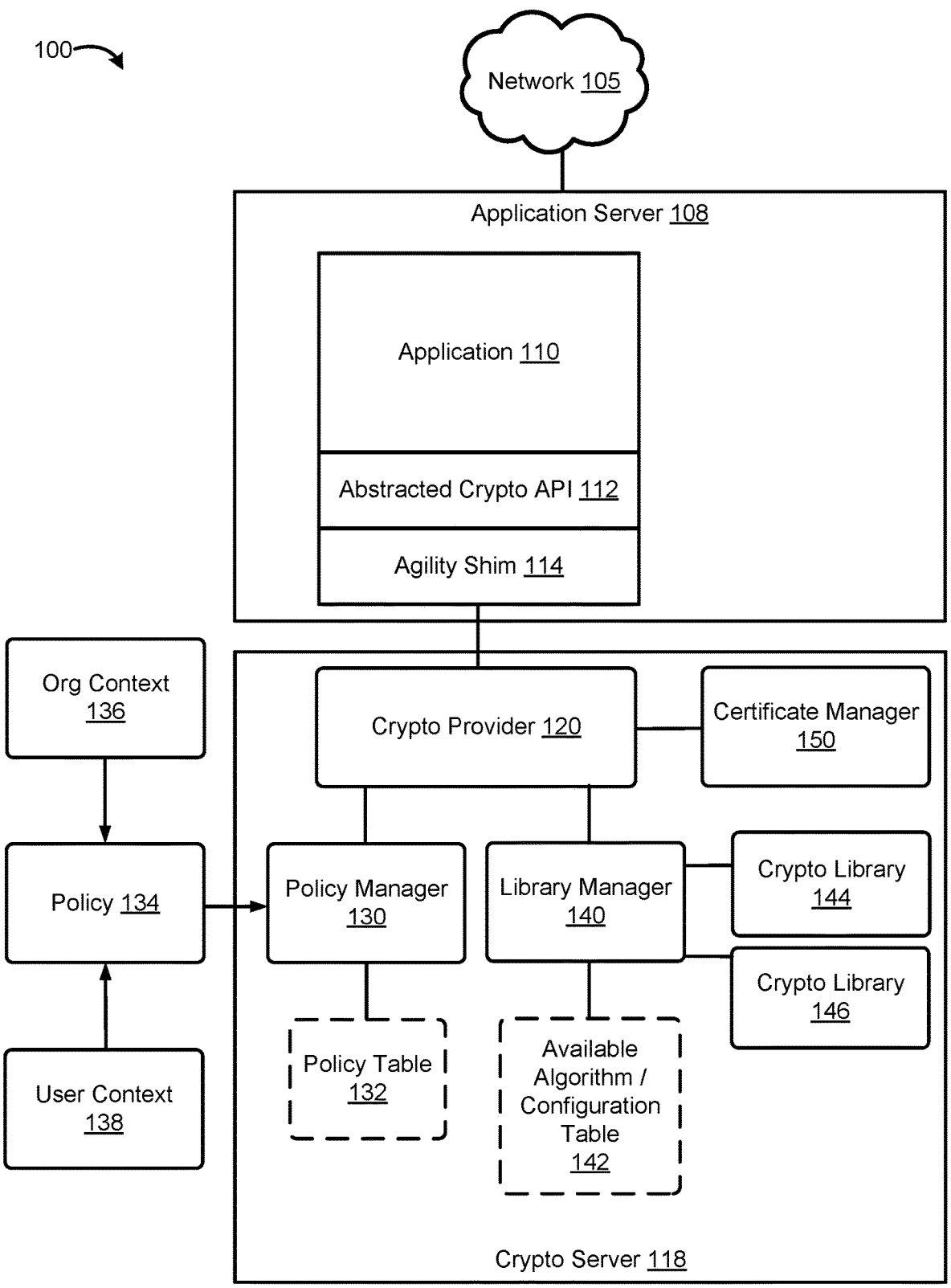
FIG. 1 is an illustration of example computing components related to certificate management for cryptographic agility, according to embodiments of the present disclosure.

The present disclosure relates to cryptographic agility. In particular, the present disclosure provides an approach for auditable cryptographic agility that involves maintaining a record of operations related to cryptographic agility on a secure digital ledger.

Cryptographic agility generally refers to techniques for dynamic selection and/or configuration of cryptographic algorithms. According to certain embodiments, logic related to selection and/or configuration of cryptographic algorithms is decoupled from the applications that utilize cryptographic functionality, and is implemented in one or more separate components. Thus, rather than an application directly calling a cryptographic library to perform cryptographic functionality, the application may call generic cryptographic functions provided by a separate cryptographic agility system, and the cryptographic agility system may then select and/or configure cryptographic algorithms, such as based on contextual information and/or policies. For instance, the cryptographic agility system may dynamically determine which libraries, algorithms, configuration values, and/or the like to select based on factors such as the type of data being encrypted, the type of application requesting encryption, the network environment(s) in which the data is to be sent, a destination to which encrypted data is to be sent, geographic locations associated with a source and/or destination of the data, attributes of users associated with the encryption, regulatory environments related to the encryption, network conditions, resource availability, performance constraints, device capabilities, and/or the like.

Dynamically selecting cryptographic techniques based on resource constraints is described in more detail in U.S. patent application Ser. No. 17/385,287, filed Jul. 26, 2021, the contents of which are incorporated by reference herein in their entirety.

In some embodiments, a proxy component may be utilized to enable cryptographic agility in legacy applications and services. Such a proxy component is described in more detail in U.S. patent application Ser. No. 17/385,401, filed Jul. 26, 2021, the contents of which are incorporated by reference herein in their entirety.

In certain embodiments, records of operations related to cryptographic agility may be written to a secure ledger for auditability. The use of such as secure ledger for auditable cryptographic agility is described in more detail in U.S. patent application Ser. No. 17/385,489, filed Jul. 26, 2021, the contents of which are incorporated by reference herein in their entirety.

For example, policies may be defined by users (e.g., administrators), and may specify rules for selecting and/or configuring cryptographic algorithms and corresponding certificates. In one example, cryptographic techniques (e.g., algorithms and/or configurations of algorithms) are tagged with different levels of security (e.g., rated from 0-10), and a policy associated with an application may specify that all data that is to be transmitted from the application to a destination in a given type of networking environment, such as a public network, is to be encrypted using a high-security algorithm (e.g., rated 8 or higher). Thus, if the application sends data (e.g., whether encrypted directly by the application or not) that is intercepted by the proxy component, and contextual information indicates that the data is to be transmitted to a device on a public network, then the cryptographic agility system, in certain embodiments, will select a cryptographic technique tagged as a high-security technique, such as with a security rating of 8 or higher.

Furthermore, the cryptographic agility system may select a corresponding certificate for use with the selected cryptographic technique. A certificate manager of the cryptographic agility system may maintain characteristics of a plurality of certificates, such as metadata that identifies the cryptographic techniques to which the certificates correspond. As described in more detail below with respect to FIG. 2, the certificate manager may generate certificates upon request, store pre-generated certificates, interact with one or more separate components for generation and/or digital signing of certificates, and/or the like. For example, the certificate manager may check to see if a pre-generated certificate is available for use with a selected cryptographic technique and, if not, may generate or obtain a new certificate that corresponds to the selected cryptographic technique. As such, the cryptographic agility system is enabled to dynamically select and provide certificates for use with dynamically-selected cryptographic techniques to enable seamless cryptographic agility.

By decoupling cryptographic logic from applications that rely on cryptographic functionality, techniques described herein provide flexibility and extensibility, thus allowing cryptographic algorithms to be continually updated, changed, and otherwise configured without requiring modifications to the applications themselves. Accordingly, changing circumstances and new threats may be addressed in a dynamic and efficient manner, and computing security may thereby be improved.

In some cases, cryptographic algorithms and/or configurations of algorithms, along with corresponding certificates, may be dynamically switched over time based on changing circumstances. Such dynamic switching may occur within an ongoing cryptographic session between two endpoints (e.g., a secure connection between two endpoints that is not interrupted by a disconnect or ending of the secure connection). For example, if a client device moves from a low-latency network to a high-latency network (such as the latency of a network that device is coupled to changes), the cryptographic agility system may switch from a cryptographic technique that requires a large amount of network resources to an alternative cryptographic technique that requires smaller amounts of network resources (e.g., a lower security algorithm that still meets the security requirements for the cryptographic operation), and may switch back if the device moves again into a lower-latency network. These changing circumstances may be determined by the cryptographic agility system based on contextual information related to each communication from the application to the client device and vice-versa. As cryptographic techniques are switched, in certain embodiments, the cryptographic agility system also dynamically switches certificates accordingly. For example, if the cryptographic agility system switches from a first cryptographic technique to a second cryptographic technique, the cryptographic agility system may also obtain or generate a corresponding certificate for use with the second cryptographic technique, and provide the corresponding certificate to a requesting entity (e.g., application or proxy component) for use in authenticating a key.

Information related to certificate management performed by the cryptographic agility system may be recorded in a secure ledger, such as a block chain, for auditing purposes. For instance, each time a certificate is added to, removed from, or modified in the certificate manager, a record of that addition, removal, or modification may be written to the secure ledger. Furthermore, every time the certificate manager selects a certificate for use with a cryptographic technique, such as based on a cryptographic request, a record of the selection may be written to the secure ledger. Records in the secure ledger may include, for instance, information about certificates (e.g., the subject, the issuer, the cryptographic technique to which a given certificate corresponds, and/or the like) and/or contextual information such as information related to a cryptographic request for which the certificate was selected. Thus, certificate management operations performed by the cryptographic agility system may be audited based on the records written to the secure ledger.

Embodiments of the present disclosure improve upon conventional cryptography techniques in which cryptographic algorithms are pre-determined for applications (e.g., at design time) by allowing cryptographic algorithms and/or configurations, as well as corresponding certificates, to be dynamically selected and changed over time based on contextual information, even if an application was not designed to support such functionality. Furthermore, cryptographic agility techniques described herein allow deprecated cryptographic techniques and/or certificates to be dynamically and efficiently removed from use without requiring any changes to underlying applications.

Additionally, techniques described herein may facilitate an organization's use of uniform policy configuration (e.g., a suite of coordinated policies), such as to orchestrate cryptographic usage across many hosts (e.g., for federated data centers deployed worldwide). Embodiments of the present disclosure may also be used to facilitate migration to new cryptographic algorithms at scale and/or to remove deprecated cryptographic algorithms from use in a centralized and coordinated manner.

FIG. 1 is an illustration 100 of example computing components related to certificate management for cryptographic agility, according to embodiments of the present disclosure.

An application server 108 is connected to a network 105. In certain embodiments, application server 108 may be a physical or virtual computing device, such as a server computer, that hosts an application 110. In some embodiments, application server 108 may be a virtual computing instance (VCI), such as a virtual machine (VM) or container that runs on a physical host computer. Network 105 may be any sort of network over which data may be transmitted, such as a local area network (LAN), cellular network, satellite-based network, the Internet, or the like. It is noted that application server 108 is included as an example computing device on which application 110 and/or associated components may be located, and other types of devices may also be used.

Application 110 generally represents a software application that requires cryptographic functionality. For example, application 110 may rely on cryptographic functionality to encrypt data that it transmits over a network (e.g., network 105), such as to one or more client devices that interact with application 110 (e.g., accessing content provided by application 110). While conventional techniques generally involve direct integration of cryptographic libraries with applications that rely on cryptographic functionality, techniques described herein involve abstracting cryptographic functionality away from applications. As such, an agility shim 114 provides an abstracted crypto application programming interface (API) 112 as a means of facilitating cooperation between application 110 and a separate cryptographic agility system. In some embodiments, agility shim 114 may be located within a proxy component that intercepts communications between application 110 and external endpoints such as client devices.

Application 110 or the proxy component may call generic cryptographic functions of abstracted crypto API 112 in order to invoke particular cryptographic functionality, and the cryptographic agility system may select cryptographic techniques and perform cryptographic operations in response to the function invocations based on contextual information.

The cryptographic agility system includes agility shim 114 and abstracted crypto API 112 as well as crypto provider 120, policy manager 130, library manager 140, and certificate manager 150. In some embodiments, while depicted as separate components, agility shim 114, abstracted crypto API 112, policy manager 130, library manager 140, and/or certificate manager 150 may be part of crypto provider 120. In certain embodiments, abstracted crypto API 112 and/or agility shim 114 are part of a proxy component located on application server 108. In alternative embodiments, abstracted crypto API 112 and/or agility shim 114 may be located on a proxy component separate from application server 108, such as on crypto server 118 or a different computing device.

Agility shim 114 may comprise a library, and generally intercepts API calls (e.g., calls to functions of abstracted crypto API 112) and redirects them to crypto provider 120. Shims generally allow new software components to be integrated with existing software components by intercepting, modifying, and/or redirecting communications. As such, agility shim 114 allows application 110 or a proxy component associated with application 110 to interact with crypto provider 120 even though the proxy component and/or application 110 itself may have no knowledge of crypto provider 120. For instance, application 110 or the proxy component may make generic cryptographic function calls (e.g., requesting that an item of data be encrypted), and these generic function calls may be intercepted by agility shim 114 and redirected to crypto provider 120.

It is noted that while embodiments of the present disclosure are depicted on application server 108 and crypto server 118, alternative embodiments may involve various components being located on more or fewer computing devices. In some cases, aspects of the cryptographic agility system may be implemented in a distributed fashion across a plurality of computing devices. In certain embodiments, said components may be located on a single computing device.

In certain embodiments, crypto server 118 comprises a physical or virtual computing device, such as a server computer, on which components of the cryptographic agility system, such as crypto provider 120, policy manager 130, library manager 140, and/or certificate manager 150, reside. For example, crypto server 118 may represent a VCI or a physical computing device. Crypto server 118 may be connected to network 105 and/or one or more additional networks.

Crypto provider 120 generally performs operations related to dynamically selecting cryptographic techniques and corresponding certificates (e.g., based on contextual information related to requests for cryptographic operations), performing the requested cryptographic operations according to the selected techniques, and providing results of the operations to the requesting components. Cryptographic techniques may include cryptographic algorithms (e.g., included in one or more libraries) and/or specific configurations of cryptographic algorithms, as described herein. In some embodiments, the cryptographic agility system is located on the same device as application 110, while in other embodiments the cryptographic agility system is located on a separate device, such as on a server that is accessible over a network.

In certain aspects, crypto provider 120 has three major subsystems, policy manager 130, library manager 140, and certificate manager 150. Policy manager 130 performs operations related to cryptographic policies, such as receiving policies defined by users and storing information related to the policies in a policy table 132. In an example, a policy 134 is based on one or more of an organizational context 136 and a user context 138 related to a cryptographic request.

Organizational context 136 may involve geographic region (e.g., country, state, city and/or other region), industry mandates (e.g., security requirements of a particular industry, such as related to storage and transmission of medical records), government mandates (e.g., laws and regulations imposed by governmental entities, such as including security requirements), and the like. For instance, policy 134 may indicate that if a cryptographic request is received in relation to a device (e.g., client device or other device, such as application server 108) associated with a particular geographic region, associated with a particular industry, and/or within the jurisdiction of a particular governmental entity, then crypto provider 120 must select a cryptographic technique that meets one or more conditions (e.g., having a particular security rating and/or being configured to protect against particular types of threats) in order to comply with relevant laws, regulations, or mandates.

User context 138 may involve user identity (e.g., a user identifier or category, which may be associated with particular privileges), data characteristics (e.g., whether the data is sensitive, classified, or the like), application characteristics (e.g., whether the application is a business application, an entertainment application, or the like), platform characteristics (e.g., details of an operating system), device characteristics (e.g., hardware configurations and capabilities of the device, resource availability information, and the like), device location (e.g., geographic location information, such as based on a satellite positioning system associated with the device), networking environment (e.g., a type of network to which the device is connected, such as a satellite or landbased network connection), and/or the like. For example, policy 134 may indicate that if a cryptographic request is received in relation to a particular category of user (e.g., administrators, general users, or the like), relating to a particular type of data (e.g., tagged as sensitive or meeting characteristics associated with sensitivity, such as being financial or medical data), associated with a particular application or type of application, associated with a particular platform (e.g., operating system), associated with a device with particular capabilities or other attributes (e.g., a client or server device having a certain amount of processing or memory resources, or having an accelerator), and/or in relation to a device in a particular location (e.g., geographic location) or type of networking environment (e.g., cellular network, satellite-based network, land network, or the like), then crypto provider 120 should select a cryptographic technique that meets one or more conditions. In some cases, a policy 134 may relate to resource constraints (e.g., based on available processing, memory, or network resources), such as specifying that cryptographic techniques must be selected based on resource availability (e.g., how much of a device's processing and/or memory resources are currently utilized, how much latency is present on a network, and the like) and/or capabilities (e.g., whether a device is associated with an accelerator) associated with devices and/or networks, while in other embodiments crypto provider 120 selects cryptographic techniques based on resource constraints independently of policy manager 130 (e.g., for all cryptographic requests regardless of whether any policies are in place). For example, policies may only relate to security levels of cryptographic techniques, such as requiring the use of cryptographic techniques associated with particular security ratings when certain characteristics are indicated in contextual information related to a cryptographic request, and resource constraints may be considered separately from policies. In one example, once all cryptographic techniques meeting the security requirements for a cryptographic request are identified based on policies, a cryptographic technique is selected from these policy-compliant cryptographic techniques based on resource constraints.

Policy table 132 stores information related to policies, such as policy 134. In some embodiments, policy table 132 maps various contextual conditions (e.g., relating to organizational context 136 and/or user context 138) to cryptographic technique characteristics (e.g., security ratings, threats protected against, resource utilization ratings, and the like). For example, a contextual condition may be the use of a certain type of application, a certain type of data, or a particular geographic location. A cryptographic technique characteristic may be, for example, a security rating (e.g., 0-10), whether the cryptographic technique is quantum-safe, what level of resource requirements the cryptographic technique has for a particular type of resource (e.g., memory, processor, or network resources), or the like. Thus, when cryptographic requests are received, policy table 132 is used to determine whether the cryptographic requests are associated with any characteristics included in policies and, if so, what cryptographic technique characteristics are required by the policies for servicing the requests.

Library manager 140 generally manages cryptographic libraries containing cryptographic algorithms. For example crypto libraries 144 and 146 each include various cryptographic algorithms, each of which may include configurable parameters, such as key size or ciphertext size. For instance, cryptographic techniques (e.g., algorithms and/or specific configurations of algorithms) may be registered with library manager 140 along with information indicating characteristics of the cryptographic techniques. Examples of algorithms include data encryption standard (DES), triple DES, advanced encryption standard (AES), and Rivest-Shamir-Adleman (RSA). An algorithm may, for example, involve symmetric key encryption or asymmetric key encryption. A configuration of an algorithm may include values for one or more configurable parameters of the algorithm, such as key size, size of lattice, which elliptic curve is utilized, number of bits of security, whether accelerators are used, ciphertext size, and/or the like. A characteristic of a cryptographic technique may be, for example, a security rating, a resource requirement rating, whether the technique requires an accelerator, whether the technique is quantum-safe, or the like. A cryptographic technique may include more than one cryptographic algorithm and/or configuration. In an example, each cryptographic technique is tagged (e.g., by an administrator) based on characteristics of the technique, such as with a security rating, an indication of threats protected against by the technique, indications of the resource requirements of the technique, and/or the like.

Information related to cryptographic techniques registered with library manager 140 is stored in available algorithm/configuration table 142. For instance, available algorithm/configuration table 142 may store identifying information of each available cryptographic technique (e.g., an identifier of a library, an identifier of an algorithm in the library, and/or one or more configuration values for the algorithm) associated with tags indicating characteristics of the technique. It is noted that policies and tags are examples of how cryptographic techniques may be associated with indications of characteristics, and alternative implementations are possible. For instance, rather than associating individual cryptographic techniques with tags, alternative embodiments may involve associating higher-level types of cryptographic techniques with tags, and associating individual cryptographic techniques with indications of types. For example, a higher-level type of cryptographic technique may be "symmetric key encryption algorithms configured with a key size of 200 bits or larger." Thus, if tags are associated with this type (e.g., including security ratings, recourse requirement ratings, and the like), any specific cryptographic techniques of this type (being symmetric key encryption algorithms, and being configured with a key size of 200 bits or more) will be considered to be associated with these tags. In another example, fuzzy logic and/or machine learning techniques may be employed, such as based on historical cryptographic data indicating which cryptographic techniques were utilized for cryptographic requests having particular characteristics.

By allowing cryptographic techniques and libraries to be registered and deregistered with library manager 140 on an ongoing basis, embodiments of the present disclosure allow the pool of possible cryptographic techniques to be continuously updated to meet new conditions and threats. For example, as new libraries are developed, these libraries may be added to library manager 140, and the cryptographic techniques in the library may be used by crypto provider 120 in servicing requests from application 110 without application 110 having any awareness of the new libraries. Similarly, by managing policies and libraries separately, policies may be defined in an abstract manner (e.g., based on characteristics of requests and cryptographic techniques) such that policies may be satisfied through the selection of new cryptographic techniques that were not known at the time of policy creation. In one particular example, a new cryptographic technique is tagged as quantum safe, meaning that the cryptographic technique was developed to be resistant to being decoded by quantum computers. For instance, the new cryptographic technique may have a high security rating (e.g., 10 out of 10) as well as high resource requirements. The new cryptographic technique is registered with library manager 140, and information about the new cryptographic technique and its characteristics is stored in available algorithm/configuration table 142. Thus, the new cryptographic algorithm is available to be selected by crypto provider 120 for servicing cryptographic requests from the proxy component related to application 110.

Continuing with the example, a policy 134 states that cryptographic requests relating to data that is long-lived (e.g., of a type that must be protected over a long amount of time, such as many years) is to be encrypted using a quantum-safe cryptographic technique if such a technique is available, unless device and/or network resource constraints prohibit the use of such a technique. Long-lived data may include, for example, classified government data, certain types of personally-identifiable information, and the like. Data that is not long-lived may include, for example, a code or password that expires after a short amount of time, a credit card number that is updated at regular intervals, network configuration data that changes on a regular basis, and the like.

Thus, when the proxy component related to application 110 submits a cryptographic request (e.g., via a call to a generic cryptographic function provided by abstracted crypto API 112) to encrypt an item of long-lived data (e.g., received from application 110 and directed to an endpoint), crypto provider 120 determines based on information stored in policy table 132 that a quantum-safe cryptographic technique is to be used if possible. Crypto provider 120 determines based on information in available algorithm/configuration table 142 that the new cryptographic technique is quantum-safe. Next, crypto provider 120 analyzes resource constraints related to the cryptographic request to determine if the new cryptographic technique can be performed. If crypto provider 120 determines that the device and/or network associated with application 110 can support the new cryptographic technique (e.g., based on available resources), then crypto provider 120 selects the new cryptographic technique for servicing the cryptographic request, and provides a response to application 110 or the proxy component (e.g., via agility shim 114) accordingly. In some cases, the response sent from crypto provider 120 to application 110 or the proxy component includes data encrypted using the selected technique. In other cases, the response includes information related to performing the selected technique to encrypt the data, and the encryption is performed by the entity from which the request was sent.

In some cases, more than one cryptographic technique may be selected for servicing a given cryptographic request. For instance, an item of data may first be encrypted using a first technique (e.g., that satisfies one or more first conditions related to policy and/or resource considerations) and then the encrypted data may be encrypted again using a second technique (e.g., that satisfies one or more second conditions related to policy and/or resource considerations).

Certificate manager 150 generally performs operations related to dynamically selecting certificates for use in authenticating keys related to cryptographic techniques. For example, certificate manager 150 may ensure that, when a cryptographic technique is selected for servicing a cryptographic request, a certificate that corresponds to the selected cryptographic technique is selected. Similarly, if a cryptographic technique is switched (e.g., based on a change in contextual information), the certificate may also be switched accordingly.

For example, in the context of public key encryption, certificates are electronic credentials that bind the identity of a certificate owner to a pair of keys (e.g., one public and one private), that can be used to digitally encrypt and sign information. A certificate allows other entities to verify that the public key contained in the certificate belongs to the entity to which the certificate was issued. For example, an application to which a certificate is issued may include the certificate in a secure communication comprising a public key to a client device, and the client device may use the certificate to verify that the key is valid and belongs to the application. A Certificate Authority (CA), a trusted third party that is relied upon to verify the matching of public keys to entities, may digitally sign a certificate. For example, a CA may provide a digital signature verifying that a given public key belongs to a particular owner (e.g., application or other entity), and the digital signature may be included in the certificate.

According to embodiments of the present disclosure, certificate manager 150 interacts with one or more separate CAs to obtain digital signatures on certificates that are dynamically selected for cryptographic agility. For instance, certificate manager 150 may obtain digital signatures on certificates "on the fly" as certificates are selected, and/or may obtain digital signatures on certificates in advance (e.g., when a certificate is first generated or added to certificate manager 150), and store the digitally-signed certificates for selection in response to cryptographic requests. In certain embodiments, certificate manager 150 itself acts as a CA.

Certificate manager 150 may generate certificates and/or may receive certificates from separate components. For example, as described in more detail below with respect to FIG. 2, certificate manager 150 may interact with separate certificate generation and/or CA components to obtain certificates and/or digital signatures, and may store certificates (in some cases with digital signatures) in a data store along with metadata indicating characteristics of the certificates (e.g., cryptographic techniques and/or entities to which the certificates correspond).

Crypto provider 120 may provide certificates along with information related to requested cryptographic operations (e.g., keys) to requesting entities (e.g., applications, proxy components, and/or the like) in response to requests. Thus, these requesting entities can use the dynamically-selected certificates to authenticate keys provided to other components (e.g., client devices) even when cryptographic techniques are dynamically selected and/or changed based on contextual information.

In some embodiments, records of operations performed by certificate manager 150 are written to a secure ledger, such as an immutable hash chain. For example, every time a certificate is added, modified, removed, selected for use in performing a cryptographic operation, and/or the like, a record may be written to a secure ledger indicating information about the action that was performed. Such records may be used for auditing purposes, to minimize the risk of tampering, and/or to perform remedial actions and/or generate notifications when potential issues are identified. For instance, an auditing component may analyze records of certificate-related operations written to the secure ledger, and may determine whether the records match patterns associated with known issues and/or comply with one or more standards. The auditing component may take action when an issue is detected, such as generating a notification or notifying certificate manager 150 to take one or more actions (e.g., preventing the use of one or more certificates, blocking a certificate change, and/or the like).

Figure 2:
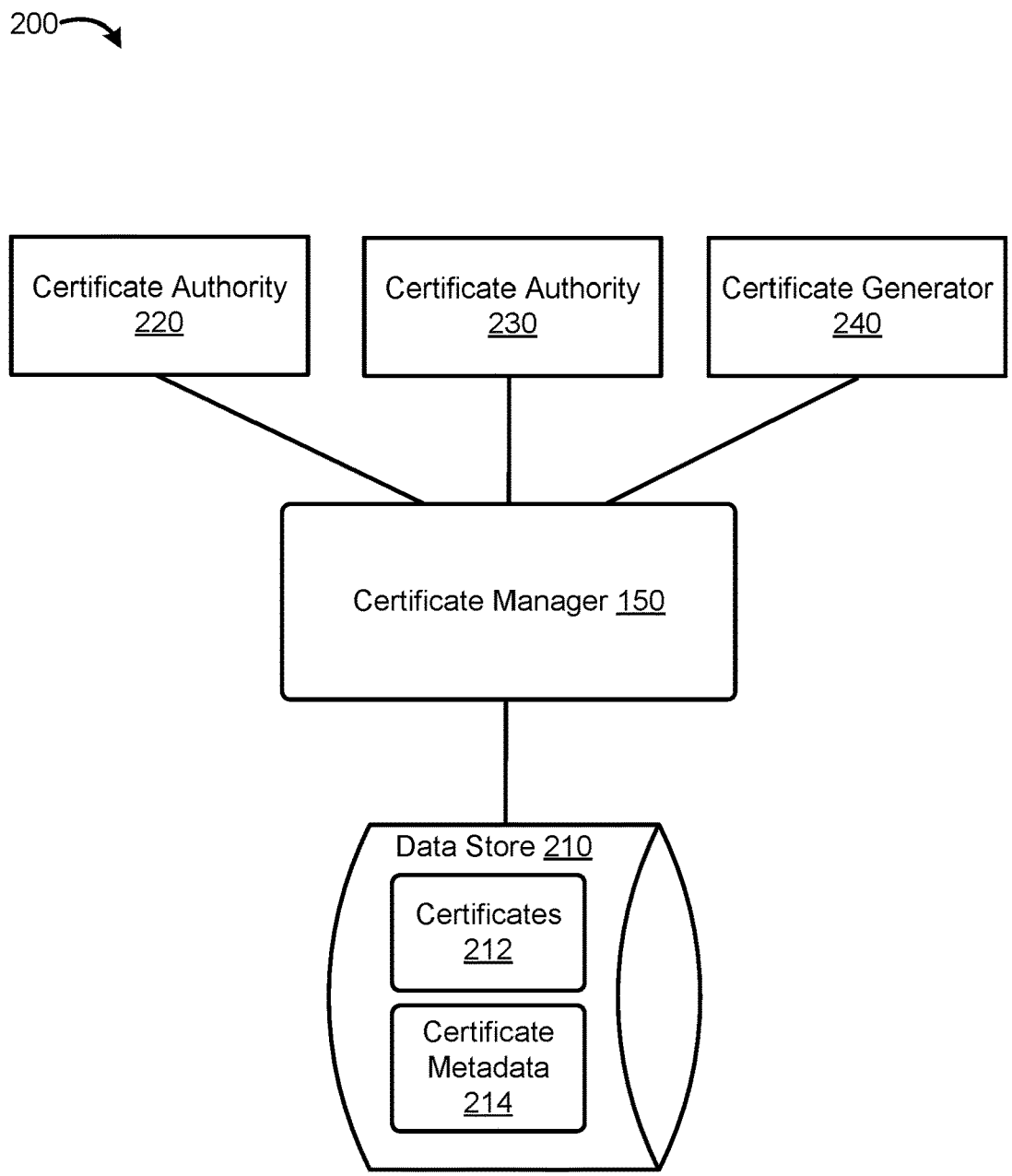
FIG. 2 is an illustration of example components related to a certificate manager.

FIG. 2 is an illustration 200 of example components related to a certificate manager. Illustration 200 includes certificate manager 150 of FIG. 1.

Certificate manager 150 is associated with a data store 210 that stores certificates 212 and certificate metadata 214. Data store 210 generally represents a data storage entity such as a database or repository. In some embodiments, data stores managing private keys and certificate generation may use security technologies like trusted platform modules (TPMs), hardware security modules (HSMs), trusted execution environments, disk encryption schemes, field programmable gate arrays (FPGAs), and the like. Certificates 212 include certificates that have been generated (e.g., by certificate manager 150 and/or one or more additional components such as certificate generator 240 or application 110 of FIG. 1) and, in some embodiments, digitally signed (e.g., by certificate manager 150 and/or one or more additional components such as certificate authorities 220 and/or 230). Certificates 212 may have been generated directly in response to cryptographic requests and/or in advance, such as when new cryptographic techniques are added to library manager 140 of FIG. 1 and/or when entities (e.g., applications) become associated with the cryptographic agility system.

Certificate metadata 214 generally includes characteristics of certificates 212 for use in selecting a certificate that is appropriate for use with a given cryptographic technique to service a given cryptographic request. For instance, certificate metadata 214 may indicate cryptographic techniques and/or entities to which certificates 212 correspond. Furthermore, certificate metadata 214 may include characteristics of types of certificates that have not yet been generated, for use in selecting a type of certificate to generate for a particular request.

Certificate authorities (CAs) 220 and 230 generally represent CAs that are separate from certificate manager 150, and with which certificate manager 150 may interact to obtain digital signatures for certificates 212. Certificate generator 240 generally represents a component that is separate from certificate manager 150 that generates certificates (e.g., based on criteria corresponding to specific cryptographic techniques and/or requests that are specified by certificate manager 150).

Certificate manager 150 may be connected to data store 210, CAs 220 and/or 230, and/or certificate generator 240 via a network, a direct connection, and/or the like. For instance, certificate manager 150 may be located on the same device as data store 210, and may be connected to CAs 220 and/or 230 and/or certificate generator 240 via one or more networks (e.g., local area networks, cellular networks, satellite networks, the Internet, and/or the like).

In some embodiments, certificate manager 150 may generate and/or obtain different certificates for different contextual conditions that may be associated with a single entity. For example, a first certificate may be selected for an application for use by a device located in a first geographic region and a second certificate may be selected for the same application for use by a device located in a second geographic region (e.g., based on policies related to the geographic regions).

Furthermore, certificates may be removed from certificate manager 150, such as in the case of certificate types being deprecated (e.g., if a corresponding cryptographic technique is deprecated). For example, by removing a deprecated certificate type from certificate manager 150, techniques described herein may allow the deprecated certificate type to be efficiently removed from use for all communications that rely on functionality provided by the cryptographic agility system.

Similarly, new types of certificates may be added to certificate manager 150 as new cryptographic techniques are added to library manager 140 of FIG. 1. For example, if a new quantum-safe cryptographic technique is registered with the cryptographic agility system, a corresponding new certificate may be generated or obtained by certificate manager 150 for use in authenticating communications related to the new quantum-safe cryptographic technique.

It is noted that the specific components and operations described herein with respect to illustration 200 are included as examples, and other techniques of certificate management for cryptographic agility are consistent with the present disclosure. For example, in some embodiments, certificate manager 150 may not store any certificates, and may generate and/or obtain (e.g., through interaction with certificate generator 240 and/or CAs 220 and 230) all certificates directly in response to particular requests (e.g., for heightened security). Furthermore, certificate generator 240 and CAs 220 and 230 are included to be representative of more or fewer components that generate and/or digitally sign certificates, and illustrate the fact that certificate manager 150 provides centralized management of certificate generation, signing, storage, and/or selection, and interacts with one or more separate components as needed.

Figure 3:
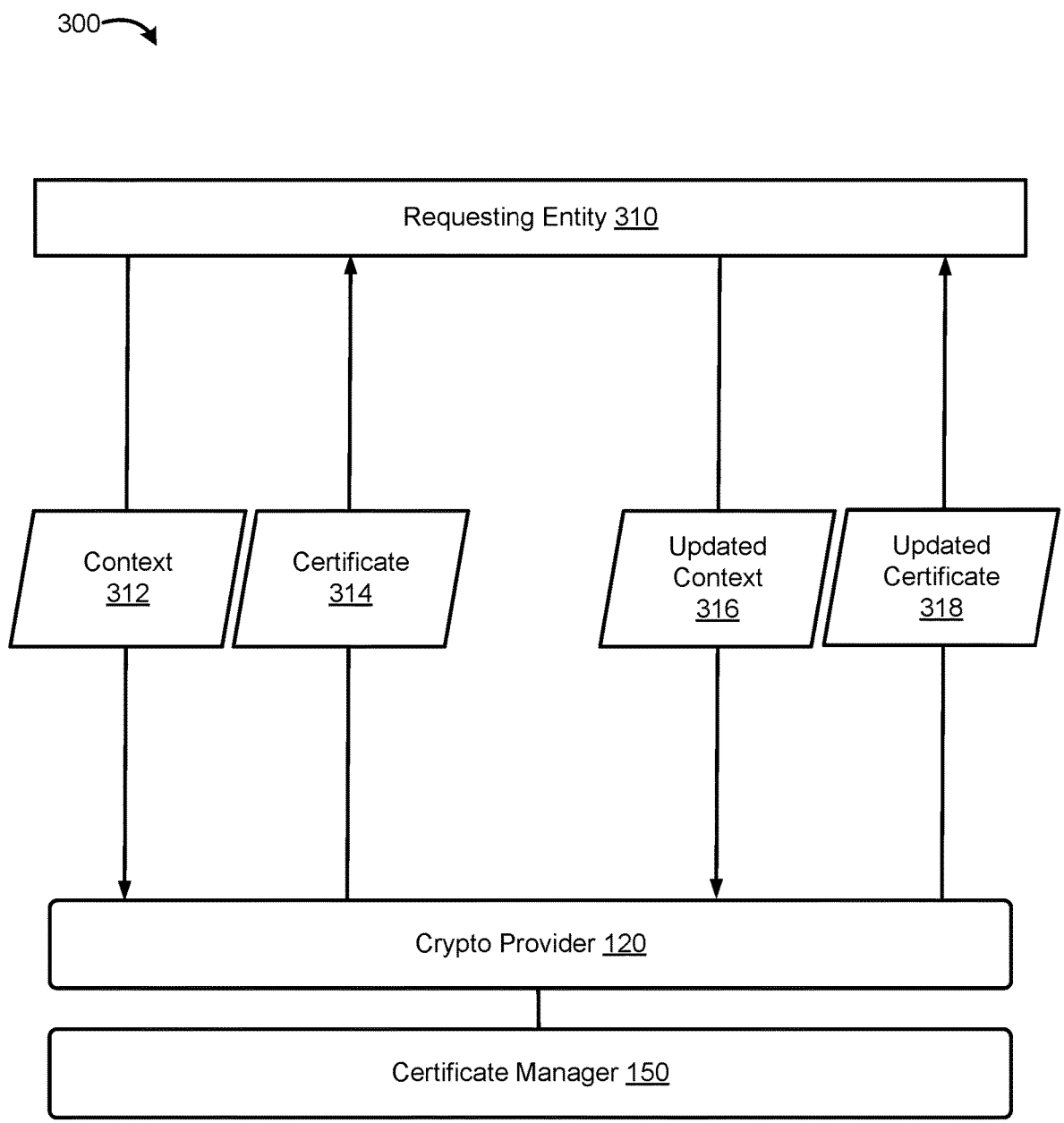
FIG. 3 is an illustration of an example related to certificate management for cryptographic agility.

FIG. 3 is an illustration 300 of an example related to certificate management for cryptographic agility. Illustration 300 includes crypto provider 120 and certificate manager 150 of FIG. 1.

A requesting entity 310 generally represents an entity that requests cryptographic functionality from crypto provider 120, such as via calls to a generic crypto API provided by agility shim 114 of FIG. 1. Requesting entity 310 may, for example, be application 110 of FIG. 1, a proxy component, a client device, and/or the like.

Requesting entity 310 provides context 312 to crypto provider 120. Context 312 may include, for example, organization context and/or user context associated with a cryptographic request, such as a request to establish a secure connection. In one example, context 312 includes information about one or more device related to the request, one or more users related to the request, data related to the request, one or more applications related to the request, and/or the like.

Crypto provider 120 selects a cryptographic technique for servicing the request based on context 312 (e.g., which may involve considering one or more policies, resource constraints, and/or the like). Furthermore, certificate manager 150 selects a certificate 314 for use in authenticating communications related to the request. For example, certificate manager 150 may generate or obtain certificate 150 based on the selected cryptographic technique (e., in view of metadata associated with certificate 150 or a type of certificate 150 indicating an association with the selected cryptographic technique). In some embodiments, certificate manager 150 obtains a digital signature for certificate 314 from one or more CAs. Certificate 314 may include, for example, an identity of requesting entity 310, a public key, information related to the selected cryptographic technique, a digital signature of a CA, and/or the like.

Crypto provider provides certificate 314 to requesting entity 310 (e.g., along with a key determined using the selected cryptographic technique), and requesting entity 310 may use certificate 314 to prove the authenticity of the key to one or more other components with which requesting entity 310 communicates securely using the selected cryptographic technique.

Certificates may be dynamically switched based on context changes. For example, requesting entity 310 provides an updated context 316 to crypto provider 120. Updated context 316 may, for example, indicate a change in resource constraints, geographic location, network, or other contextual attribute, and prompts a change in cryptographic technique. For instance, crypto provider 120 may switch to a different cryptographic technique that is better suited to updated context 316 than the previously-selected cryptographic technique.

As such, certificate manager 150 selects an updated certificate 318 for use in authenticating a key related to the different cryptographic technique. For example, certificate manager 150 may generate or obtain updated certificate 318 based on the different cryptographic technique, which may involve obtaining a digital signature for updated certificate 318 from a CA.

Crypto provider 120 provides updated certificate 318 to requesting entity 310 (e.g., along with a new key determined using the different cryptographic technique), and requesting entity 310 may use updated certificate 318 to prove the authenticity of the new key to one or more other components with which requesting entity 310 communicates securely using the different cryptographic technique.

Figure 4:
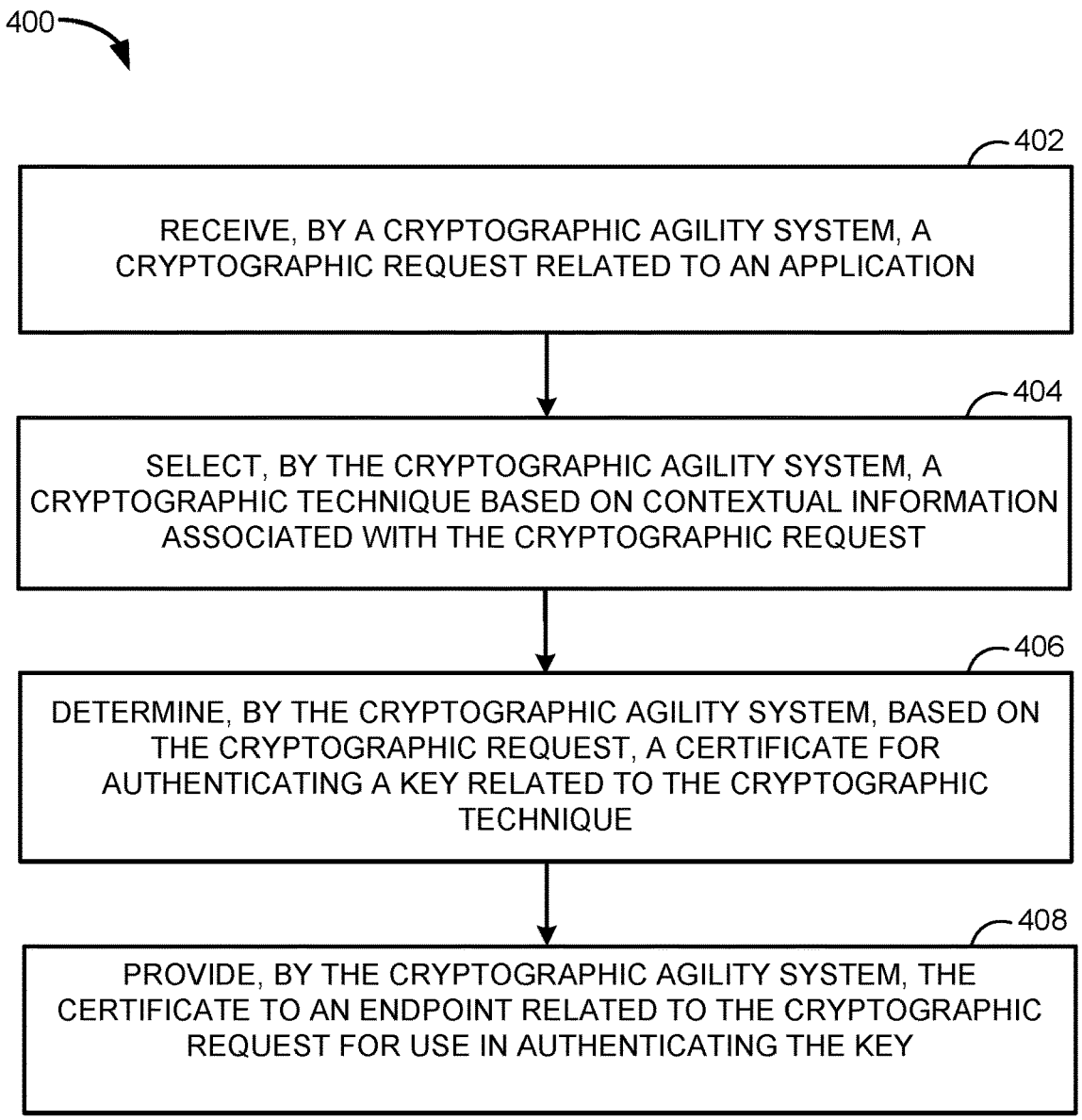
FIG. 4 depicts example operations related to certificate management for cryptographic agility according to embodiments of the present disclosure.

FIG. 4 depicts example operations 400 related to certificate management for cryptographic agility according to embodiments of the present disclosure. For example, operations 400 may be performed by one or more components of the cryptographic agility system described above with respect to FIGS. 1-3.

Operations 400 begin at step 402, with receiving, by a cryptographic agility system, a cryptographic request related to an application.

Operations 400 continue at step 404, with selecting, by the cryptographic agility system, a cryptographic technique based on contextual information associated with the cryptographic request.

Operations 400 continue at step 406, with determining, by the cryptographic agility system, based on the cryptographic request, a certificate for authenticating a key related to the cryptographic technique. In some embodiments, determining, by the cryptographic agility system, based on the cryptographic request, the certificate for authenticating the key related to the cryptographic technique comprises locating the certificate in a data store based on the cryptographic request. For example, the data store may comprise a plurality of certificates associated with metadata indicating suitability of the certificates for different cryptographic techniques.

In other embodiments, determining, by the cryptographic agility system, based on the cryptographic request, the certificate for authenticating the key related to the cryptographic technique comprises generating the certificate based on the cryptographic technique or causing the certificate to be generated based on the cryptographic technique.

In some embodiments, determining, by the cryptographic agility system, based on the cryptographic request, the certificate for authenticating the key related to the cryptographic technique comprises communicating with one or more separate components that digitally sign the certificate Operations 400 continue at step 408, with providing, by the cryptographic agility system, the certificate to an endpoint related to the cryptographic request for use in authenticating the key. Some embodiments further comprise generating, by the cryptographic agility system, the key using the cryptographic technique.

In some embodiments, the endpoint related to the cryptographic request comprises one of: the application; a proxy component related to the application; or a client device related to the application.

Some embodiments further comprise determining, by the cryptographic agility system, a change related to the contextual information associated with the cryptographic request, switching, by the cryptographic agility system, to a different cryptographic technique for the cryptographic request based on the change, and determining, by the cryptographic agility system, based on the change, a different certificate for use in for authenticating a different key related to the different cryptographic technique. For example, as described above, the change may occur during an ongoing cryptographic session between the application and an endpoint, and the cryptographic agility system may switch to the different cryptographic technique and the different certificate during the ongoing cryptographic session.

Certain embodiments further comprise writing, by the cryptographic agility system, information related to determining the certificate for authenticating the key related to the cryptographic technique to a secure ledger.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of cryptographic agility, comprising:
   receiving, by a cryptographic agility system running on one or more processors, a cryptographic request related to an application;
   selecting, by the cryptographic agility system, a cryptographic technique based on contextual information associated with the cryptographic request;
   determining, by a certificate manager of the cryptographic agility system, based on the cryptographic request and metadata stored in a certificate data store, whether a new certificate needs to be generated for use as a certificate for authenticating a key related to the cryptographic technique or whether a pre-generated certificate may be used as the certificate; and
   providing, by the cryptographic agility system, the certificate to an endpoint related to the cryptographic request for use in authenticating the key.

2. The method of claim 1, wherein further comprising locating the pre-generated certificate in the certificate data store based on the cryptographic request.

3. The method of claim 2, wherein the certificate data store comprises a plurality of certificates associated with metadata indicating suitability of the certificates for different cryptographic techniques.

4. The method of claim 1, further comprising generating, by the cryptographic agility system, the new certificate based on the cryptographic technique.

5. The method of claim 1, further comprising communicating with one or more separate components that digitally sign the certificate.

6. The method of claim 1, wherein the endpoint related to the cryptographic request comprises one of:
   the application;
   a proxy component related to the application; or
   a client device related to the application.

7. The method of claim 1, further comprising:
   determining, by the cryptographic agility system, a change related to the contextual information associated with the cryptographic request;
   switching, by the cryptographic agility system, to a different cryptographic technique for the cryptographic request based on the change; and
   determining, by the cryptographic agility system, based on the change, a different certificate for use in for authenticating a different key related to the different cryptographic technique.

8. The method of claim 7, wherein the change and the switching occur during an ongoing cryptographic session between the application and an endpoint.

9. The method of claim 1, further comprising writing, by the cryptographic agility system, to a secure ledger, information related to determining whether the new certificate needs to be generated or whether the pre-generated certificate may be used.

10. A system for cryptographic agility, comprising:
    at least one memory; and
    at least one processor coupled to the at least one memory, the at least one processor and the at least one memory configured to:
    receive, by the system, a cryptographic request related to an application;
    select, by the system, a cryptographic technique based on contextual information associated with the cryptographic request;
    determine, by a certificate manager of the system, based on the cryptographic request and metadata stored in a certificate data store, whether a new certificate needs to be generated for use as a certificate for authenticating a key related to the cryptographic technique or whether a pre-generated certificate may be used as the certificate; and
    provide, by the system, the certificate to an endpoint related to the cryptographic request for use in authenticating the key.

11. The system of claim 10, wherein the at least one processor and the at least one memory are further configured to locate the pre-generated certificate in the certificate data store based on the cryptographic request.

12. The system of claim 11, wherein the certificate data store comprises a plurality of certificates associated with metadata indicating suitability of the certificates for different cryptographic techniques.

13. The system of claim 10, wherein the at least one processor and the at least one memory are further configured to generate, by the system, the new certificate based on the cryptographic technique.

14. The system of claim 10, wherein the at least one processor and the at least one memory are further configured to communicate with one or more separate components that digitally sign the certificate.

15. The system of claim 10, wherein the endpoint related to the cryptographic request comprises one of:
    the application;
    a proxy component related to the application; or
    a client device related to the application.

16. The system of claim 10, wherein the at least one processor and the at least one memory are further configured to:
    determine, by the system, a change related to the contextual information associated with the cryptographic request;
    switch, by the system, to a different cryptographic technique for the cryptographic request based on the change; and
    determine, by the system, based on the change, a different certificate for use in for authenticating a different key related to the different cryptographic technique.

17. The system of claim 16, wherein the change and the switching occur during an ongoing cryptographic session between the application and an endpoint.

18. The system of claim 10, wherein the at least one processor and the at least one memory are further configured to write, by the system, to a secure ledger, information related to determining whether the new certificate needs to be generated or whether the pre-generated certificate may be used.

19. A non-transitory computer-readable medium storing instructions that, when executed by one or more processors, cause the one or more processors to:
    receive, by a cryptographic agility system, a cryptographic request related to an application;
    select, by the cryptographic agility system, a cryptographic technique based on contextual information associated with the cryptographic request;
    determine, by a certificate manager of the cryptographic agility system, based on the cryptographic request and metadata stored in a certificate data store, whether a new certificate needs to be generated for use as a certificate for authenticating a key related to the cryptographic technique or whether a pre-generated certificate may be used as the certificate; and provide, by the cryptographic agility system, the certificate to an endpoint related to the cryptographic request for use in authenticating the key.

20. The non-transitory computer-readable medium of claim 19, wherein the at least one processor and the at least one memory are further configured to locate the pre-generated certificate in the certificate data store based on the cryptographic request.

* * * * *